United States Patent
Wasiek et al.

(10) Patent No.: US 10,086,831 B2
(45) Date of Patent: Oct. 2, 2018

(54) METHOD FOR ASSISTING A DRIVER OF A MOTOR VEHICLE COMBINATION, COMPUTER SOFTWARE PRODUCT, LANE DEPARTURE WARNING SYSTEM

(71) Applicant: GM GLOBAL TECHNOLOGY OPERATIONS LLC, Detroit, MI (US)

(72) Inventors: Dennis Wasiek, Ruesselsheim (DE);
Justus Illium, Ruesselsheim (DE);
Thomas Schramm, Ruesselsheim (DE);
Torsten Kanning, Ruesselsheim (DE);
Carsten Neitzke, Ruesselsheim (DE)

(73) Assignee: GM GLOBAL TECHNOLOGY OPERATIONS LLC, Detroit ( * ) Notice: Subject to any disclaimer, the term of this patent is extended or adjusted under 35 U.S.C. 154(b) by 26 days.

(21) Appl. No.: 15/268,871

(22) Filed: Sep. 19, 2016

(65) Prior Publication Data
US 2017/0080928 A1    Mar. 23, 2017

(30) Foreign Application Priority Data

Sep. 19, 2015  (DE) .................. 10 2015 012 362

(51) Int. Cl.
*B60W 30/095* (2012.01)
*B60W 10/20* (2006.01)
(Continued)

(52) U.S. Cl.
CPC .......... *B60W 30/095* (2013.01); *B60W 10/20* (2013.01); *B60W 30/12* (2013.01);
(Continued)

(58) Field of Classification Search
CPC ............. B60W 2520/10; B60W 30/12; B60W 50/082; B60W 2710/30; B60W 40/072;
(Continued)

(56) References Cited

U.S. PATENT DOCUMENTS 6,198,386 B1 * 3/2001 White, II .................. B60R 1/00
33/264
7,367,407 B2 * 5/2008 Lannert .................. E01H 5/067
172/684.5

(Continued)

FOREIGN PATENT DOCUMENTS

DE   102013000199 A1   7/2014
DE   102015102889 A1   9/2015
EP      1921591 A1    5/2008

OTHER PUBLICATIONS

German Patent Office, German Search Report for German Application No. 102015012362.9, dated May 10, 2016.

*Primary Examiner* — Yazan A Soofi
*Assistant Examiner* — Luis A Martinez Borrero
(74) *Attorney, Agent, or Firm* — Lorenz & Kopf, LLP

(57) ABSTRACT

A method for assisting a driver of a motor vehicle combination with a towing vehicle and a trailer is described. A width of the motor vehicle combination is determined and a traffic lane is detected. A space required by the motor vehicle combination when travelling is predicted. A nominal track for the towing vehicle is calculated such that the motor vehicle combination remains inside the traffic lane. A computer software product, a lane departure warning system and a towing vehicle are also described.

16 Claims, 1 Drawing Sheet

(51) Int. Cl.
  *B60W 30/12* (2006.01)
  *B60W 50/14* (2012.01)
  *G05D 1/02* (2006.01)
  *G08G 1/16* (2006.01)
  *G06K 9/00* (2006.01)
  *B62D 13/00* (2006.01)
  *B62D 15/02* (2006.01)

(52) U.S. Cl.
  CPC ............ *B60W 50/14* (2013.01); *B62D 13/00* (2013.01); *B62D 15/025* (2013.01); *G05D 1/021* (2013.01); *G06K 9/00798* (2013.01); *G08G 1/167* (2013.01); *B60W 2420/42* (2013.01); *B60W 2420/54* (2013.01); *B60W 2710/207* (2013.01)

(58) Field of Classification Search
  CPC ......... B60W 50/0205; B60W 2420/42; B60W 30/0956; B60W 30/095; B60W 30/09; B60W 40/02; B60W 30/165
  See application file for complete search history.

(56) References Cited

U.S. PATENT DOCUMENTS

| | | | | |
|---|---|---|---|---|
| 7,561,032 B2* | 7/2009 | Huang | ............... | B60Q 9/008 340/435 |
| 7,904,222 B2 | 3/2011 | Lee et al. | | |
| 8,543,254 B1* | 9/2013 | Schut | ............... | B60T 7/22 348/135 |
| 8,665,078 B2* | 3/2014 | Van Wiemeersch | ............... | B60W 30/12 340/425.5 |
| 9,129,528 B2* | 9/2015 | Lavoie | ............... | G08G 1/0962 |
| 9,180,908 B2 | 11/2015 | Van Dan Elzen et al. | | |
| 9,238,483 B2* | 1/2016 | Hafner | ............... | B62D 13/06 |
| 9,296,417 B2* | 3/2016 | Wesenberg | ............... | B62D 5/0457 |
| 9,373,044 B2* | 6/2016 | Wallat | ............... | B62D 15/025 |
| 9,403,480 B2* | 8/2016 | Faeuster | ............... | B62D 15/025 |
| 9,428,188 B2* | 8/2016 | Schwindt | ............... | B60W 30/12 |
| 9,758,163 B2* | 9/2017 | Van Dan Elzen | ............... | B60W 30/12 |
| 9,948,904 B2* | 4/2018 | Schofield | ............... | H04N 7/183 |
| 2005/0242931 A1* | 11/2005 | Gunderson | ............... | B60R 21/013 340/431 |
| 2007/0179697 A1* | 8/2007 | Holler | ............... | B60T 7/22 701/70 |
| 2008/0186204 A1* | 8/2008 | Buckley | ............... | G08G 1/165 340/901 |
| 2010/0238283 A1* | 9/2010 | Kim | ............... | B60W 50/16 348/135 |
| 2011/0140872 A1* | 6/2011 | McClure | ............... | B60Q 9/008 340/431 |
| 2013/0027195 A1* | 1/2013 | Van Wiemeersch | ............... | B60W 30/12 340/431 |
| 2014/0085472 A1* | 3/2014 | Lu | ............... | B60R 1/002 348/148 |
| 2014/0118182 A1* | 5/2014 | Oh | ............... | G01S 13/867 342/52 |
| 2014/0176716 A1* | 6/2014 | Wallat | ............... | B62D 15/025 348/148 |
| 2015/0073659 A1* | 3/2015 | Lee | ............... | B60W 30/09 701/41 |
| 2017/0057499 A1* | 3/2017 | Kim | ............... | B60Q 9/008 |
| 2017/0185852 A1* | 6/2017 | Pliefke | ............... | G06K 9/00805 |
| 2017/0247054 A1* | 8/2017 | Lee | ............... | B62D 15/029 |
| 2018/0011172 A1* | 1/2018 | Cashler | ............... | G01S 7/411 |
| 2018/0068447 A1* | 3/2018 | Prasad | ............... | B60R 1/00 |
| 2018/0068566 A1* | 3/2018 | Prasad | ............... | G08G 1/167 |

\* cited by examiner

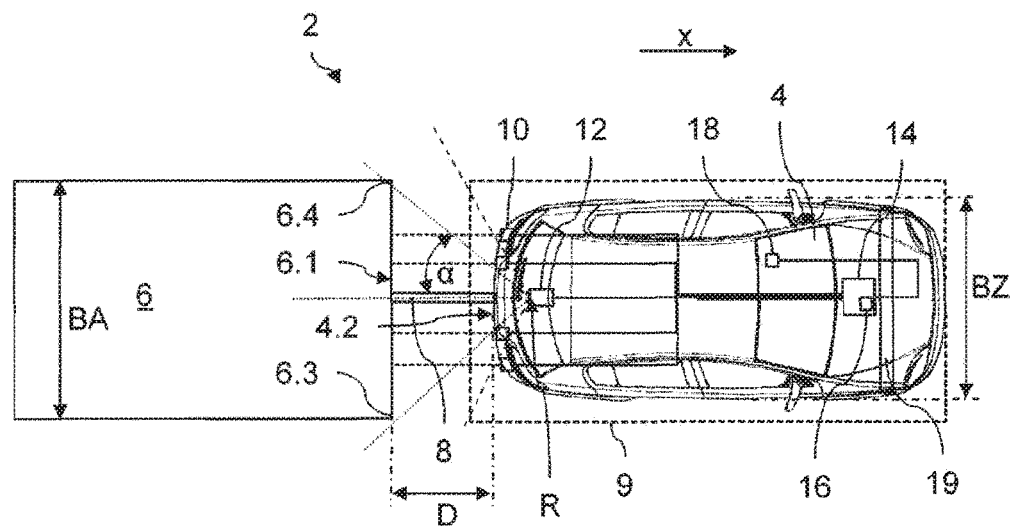
Fig. 1
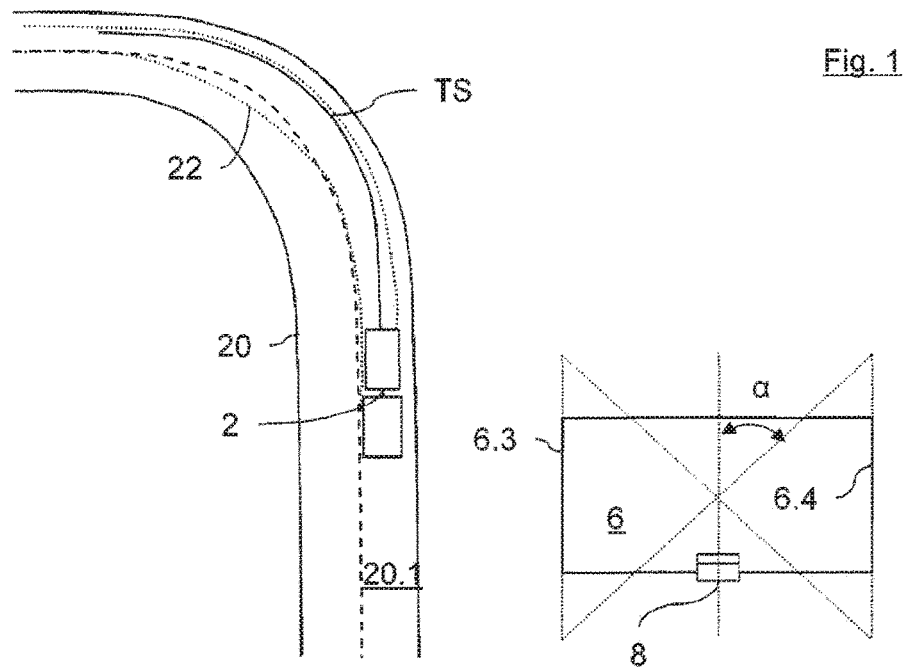
Fig. 2
Fig. 3

METHOD FOR ASSISTING A DRIVER OF A MOTOR VEHICLE COMBINATION, COMPUTER SOFTWARE PRODUCT, LANE DEPARTURE WARNING SYSTEM

CROSS-REFERENCE TO RELATED APPLICATION

This application claims priority to German Patent Application No. 102015012362.9, filed Sep. 19, 2015, which is incorporated herein by reference in its entirety.

TECHNICAL FIELD

The present disclosure pertains to a method for assisting a driver of a motor vehicle combination, a computer software product, a lane departure warning system and a towing vehicle.

BACKGROUND

DE 10 2013 000 199 A1 discloses a method for assisting a driver of a motor vehicle combination when negotiating a bend in the road, wherein a traffic lane is detected and wherein an anticipated space required as the swept path by the motor vehicle combination when travelling is predicted. In this case, a nominal track for a towing vehicle of the motor vehicle combination is determined such that an anticipated swept path of a semi-trailer or trailer may be predicted to remain inside the traffic lane or centered in the traffic lane if the vehicle follows the nominal track. A current calculated front wheel steering angle specified by the driver, a current travel speed and the information as to whether the towing vehicle is coupled to a semi-trailer or a trailer are captured or calculated as the measurement variables for the motor vehicle.

Other factors must also be taken into account in order to calculate the space that fill actually be required, but these are not considered by the known method.

Accordingly, the problem to be addressed is that of refining methods, lane departure warning systems and towing vehicles of the kind described in the introduction so that more precise assistance is possible for the driver of a motor vehicle combination.

SUMMARY

The present disclosure describes a method for assisting a driver of a motor vehicle combination. The motor vehicle combination includes a towing vehicle and a trailer, wherein a width of the motor vehicle combination is determined, wherein a traffic lane is detected, and wherein a space required by the motor vehicle combination when travelling is predicted, and wherein a nominal track for the towing vehicle is calculated such that the motor vehicle combination remains inside the traffic lane. For the present purposes, the term trailer may also refer to a trailer or semi-trailer.

By taking the width of the trailer into account as well, it is possible to determine the overall width of the motor vehicle combination. The overall width may be determined by the towing vehicle if the trailer is narrower than the towing vehicle, but it can also be determined by the trailer if the trailer is wider than the towing vehicle. With the method, it is possible to achieve better centering of the motor vehicle combination in a lane, because the width of the trailer can be taken into account. This can be as useful for driving on a straight course as when negotiating a bend.

The swept path of the trailer depending on the steering angle is very important when negotiating a bend. If the swept path can be determined more precisely using knowledge about the width of the trailer, it thus becomes possible to improve driver assistance. The quality of collision warnings can also be improved as part of the driver assistance system by taking into account the width of the trailer being towed.

In a first variant, a width of the trailer is calculated. Although the width may be determined by making an input by the driver, for example, a width calculation is performed automatically. A calculation of the width of the trailer thus has the advantage that it may be carried out automatically, without further action by the driver.

In a further refinement of this variant, the width of the trailer may be calculated by at least one sensor that is directs backwards, that is to say against the direction of travel. In this way, the width of the trailer can be determined by sensors which may all be disposed in the towing vehicle, so it is no longer necessary to install special equipment in the trailer in order to carry out the method.

In a further refinement of this valiant, the width of the trailer may be determined from a distance between the trailer and the towing vehicle and the determination of an angle from a reference point to a front outside edge of the trailer in the direction of travel front. The vast majority of trailers are substantially rectangular in a plan view, so the front outside edge thereof is sufficient for determining the width of the trailer. The width of the trailer can be calculated with the aid of the angle functions by using the distance of the trailer and determining an angle between a reference point and a front outside edge.

If the reference point is in the center, that is to say in a central axis, it is sufficient to measure one side only, since the overall width of the trailer can be derived by doubling the value obtained thereby. If the corresponding sensor is arranged off-center, the location of the sensor relative to the towing vehicle must be known in order to be able to make appropriate corrections. Most trailers are symmetrical, so a correction and doubling of the value is sufficient.

According to a further aspect development, the outside edges on both sides may be measured, which enables compensation to be made for a possibly existing angle between the longitudinal axis of the trailer and a steering angle of the towing vehicle, since values are calculated for a left and a right side, which may then be added together to return the width of the trailer.

In another advanced variant, the width of the trailer may be calculated by a reversing camera. Reversing cameras have a given focal length, with the result that a certain image column in which the trailer ends can always be assigned to a corresponding acceptance angle. Accordingly, when the trailer is captured in the camera image, it is thus possible with image processing methods to determine the angle formed by the trailer. As an alternative to cameras, in some variants radar sensors may be used, for example.

In another variant, the distance from the trailer to the towing vehicle may be calculated using rear-facing ultrasonic sensors on the towing vehicle. These may be used to determine the adjacent leg of the angle.

In another variant, the space required when driving may be predicted on the basis of the dimensions of the towing vehicle and the dimensions of the trailer. This enables the required space to be predicted with even greater precision.

In further developments, the respective lengths of the towing vehicle and/or the trailer may be considered as dimensions of the towing vehicle and the trailer as well as the corresponding widths of the towing vehicle and/or trailer.

In another variant, it may be provided that a warning may be output to the driver if it appears imminent that the vehicle will exceed the limits of the traffic lane. This enables the driver to take corrective steering action if the vehicle is about to exceed the limits of the corresponding traffic lane.

In another valiant, it may be provided that a corrective steering moment is entered in a steering system of the towing vehicle if the vehicle is about to exceed the limits of the traffic lane. In this way, automatic correction may be effected by the corresponding method.

Another variant provides that the method is activated by a trailer sensor. The trailer sensor is able to detect when a trailer is coupled, and initiates the method accordingly. In this way, the method is not performed if no trailer is attached to the towing vehicle.

In another variant, a device for assisting a driver of a motor vehicle combination including a towing vehicle and a trailer. The device is configured to determine the width of the motor vehicle combination, detect a traffic lane, predict a space required by the motor vehicle combination when travelling, calculate a nominal track for the towing vehicle in such manner that the motor vehicle combination remains within the traffic lane.

In a variant, the device is configured to determine a width of the trailer. In another variant, a rear-facing sensor may be provided to determine the width of the trailer.

In another variant, the device is configured to determine a distance between the trailer and the towing vehicle and determine the angle between a reference point and a front outside edge of the trailer may be provided. In a variant, the device may include a reversing camera.

In a variant representing a further development, the device may include rear-facing ultrasonic sensors on the towing vehicle which are able to measure the distance from the trailer to the towing vehicle.

In another variant, the device may be configured to predict the space required when travelling on the basis of dimensions of the towing vehicle and the trailer.

In another variant, the device may be configured to warn the driver if the vehicle is about the move outside the traffic lane. In a further refined variant, means may be provided for introducing a corrective steeling moment into a steering system of the towing vehicle. In another advanced variant, a trailer sensor may be provided for activating the method.

In a further variant a computer software product is provided with a machine-readable storage medium, on which commands are embedded that, when executed by a computer unit, prepare the computer unit so it is able to carry out the described method.

In one configuration, the device relates to a lane departure warning system of a towing vehicle with lane detection and a computing unit for predicting a space required when travelling. At least one rearward detecting sensor is connected to the computing unit and configured to capture a width of a trailer coupled to a towing vehicle.

In a first variant thereof, at least one sensor may be provided for detecting a distance from the trailer and at least one sensor may be provided for detecting an angle formed by the trailer with respect to a reference point. When the distance and the angle formed have been obtained, the width of the trailer may be determined using simple geometrical calculations.

In another variant, an ultrasonic sensor may be provided for determining the distance of the trailers and a rear-facing camera for capturing the angle formed by the trailer may be provided. Corresponding sensors may also be used for other functions, particularly for reversing assistance, when a trailer is not attached to the towing vehicle.

In another variant, a towing vehicle is provided with a lane keeping system of the kind described earlier. Such a towing vehicle can be used for safe driving of vehicles with trailers.

BRIEF DESCRIPTION OF THE DRAWINGS

The present disclosure will hereinafter be described in conjunction with the following drawing figures, wherein like numerals denote like elements.

FIG. 1 is a schematic plan view of a motor vehicle combination;

FIG. 2 is a schematic representation of a predicted space required by the motor vehicle combination of FIG. 1 in a bend; and FIG. 3 is a schematic view of a trailer from a towing vehicle.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

FIG. 1 shows a plan view of a motor vehicle combination 2 with a towing vehicle 4 and a trailer 6 attached to the towing vehicle 4. Towing vehicle 4 has a width BZ. Trailer 6 has a width BA, wherein BA is greater than BZ. Thus, trailer 6 is wider than towing vehicle 4. A distance D exists between a rear end of towing vehicle 4 and a front end of trailer 6, determined by a drawbar 8.

Towing vehicle 4 is equipped with a lane departure warning system 9 (indicated by dashed frame). Lane departure warning system 9 has ultrasonic sensors 10 at its rear end 4.2. In addition, a reversing camera 12 directed backwards, opposite to a direction of travel X is provided. Ultrasonic sensors 10 and reversing camera 12 are connected to a controller 14, which evaluates the information from the ultrasonic sensors 10 and the reversing camera 12.

Reversing camera 12 defines a reference point R, from which a measurement is taken. The position of reference point R relative to towing vehicle 4 and relative to ultrasonic sensors 10 is known, so it can be used to calculate necessary angular corrections for determining the width BA of trailer 4.

Controller 14 is equipped with a memory 16 in which a computer software product is stored, and which is used in a method for assisting a driver of motor vehicle combination 2 when it is executed in controller 14. Controller 14 is activated by a trailer sensor 17 connected to controller 14 as soon as trailer 6 is coupled to towing vehicle 4, e.g., via a trailer hitch (not shown).

A front camera 18 monitors a traffic region in front of towing vehicle 2 and detects a traffic lane (see FIG. 2) of towing vehicle 2. In this way, it is possible to predict a space that motor vehicle combination 2 will take up.

Width BA of trailer 6 may be determined with the aid of reversing camera 12 and ultra-sonic sensors 10. Ultrasonic sensors 10 may determine a distance D between a front end 6.1 of trailer 6 and a rear end 4.2 of towing vehicle 4. The reversing camera may capture an angle α, that is formed between the front corners 6.3, 6.4 of trailer 6. For this purpose, a corresponding image processing system may be provided in reversing camera 12 and/or in controller 14. The determination of width BA then functions using the tangent function.

If reversing camera 12 is not arranged directly on at the rear end of towing vehicle 4, as illustrated, a different angle may be formed, which is still in a unique relationship with the corresponding angle. It is therefore a simple matter to make the appropriate conversion.

Towing vehicle 4 includes a steering system 19, in which lane departure warning system 9 may intervene and introduce steering moments to correct lane following.

FIG. 2 shows a road 20 with a traffic lane 20.1, on which motor vehicle combination 2 is travelling. A warning may be output to the driver of the motor vehicle combination based on the vehicle's speed, steering angle and the information about the dimensions of motor vehicle combination 2 if the motor vehicle is about to move outside of traffic lane 20.1. Controller 14 is able to predict a required space 22. Depending on the respective variation of the lane departure warning system 9 a steering correction of towing vehicle 4 via intervention in the steering system 19 is also possible, in order to keep motor vehicle combination 2 on a nominal track TS.

FIG. 3 shows a view of trailer 6 from towing vehicle 4, as is captured by reversing camera 12. In this context, trailer 6 adopts a certain acceptance angle, which can be ascertained with image analysis algorithms. From this, angle $\alpha$ can be determined. Using the known distance width BA of trailer 6 is found.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method for assisting a driver of a motor vehicle combination with a towing vehicle and a trailer comprising:
   determining, by a controller, a width of the motor vehicle combination;
   detecting, by a lane detector, a traffic lane;
   predicting, by the controller, a space required by the motor vehicle combination when travelling;
   calculating, by the controller, a nominal track for the towing vehicle such that the motor vehicle combination remains within the traffic lane, wherein the nominal track provides an anticipated path to maintain the motor vehicle combination in the traffic lane including in a curve;
   defining, by the controller, the nominal track through the curve based on the space required using a speed of the motor vehicle combination, a steering angle of the towing vehicle, and dimensions of motor vehicle combination;
   detecting, by a lane departure warning system, when the motor vehicle combination is about to move outside the traffic lane; and
   delivering, by the controller, a warning when the motor vehicle combination is about to move outside the traffic lane, as indicated by the motor vehicle combination moving off the nominal track.

2. The method according to claim 1, further comprising:
   determining the speed of the motor vehicle combination;
   determining the steering angle of the towing vehicle; and
   determining, by a sensor and the controller, dimensions of the trailer;
   wherein calculating the nominal track includes using the speed, the steering angle and the dimensions to calculate the nominal track.

3. The method according to claim 2, wherein the nominal track departs from a center of the traffic lane when the motor vehicle combination is anticipated to travel through the curve.

4. The method according to claim 3, further comprising calculating the width of the trailer based on a distance of trailer from towing vehicle and an angular determination between a reference point and a front outside edge of the trailer.

5. The method according to claim 3, further comprising controlling, by the controller, a steering system of the motor vehicle to maintain the motor vehicle combination on the nominal track.

6. The method according to claim 4, further comprising determining the distance of the trailer from towing vehicle using rear-facing ultrasonic sensors on the towing vehicle.

7. The method according to claim 2, wherein the nominal track is calculated to maintain the motor vehicle combination centered in the traffic lane except when the motor vehicle combination travels through a curve that requires departing from being centered in the traffic lane due to the space that is calculated.

8. The method according to claim 1, further comprising predicting the space required when travelling on the basis of the dimensions of the towing vehicle and the dimensions of the trailer.

9. The method according to claim 1, further comprising:
   capturing, by a reversing camera, an angle $\alpha$, that is formed between front corners of the trailer; and
   determining, by the controller, the width of the trailer from the distance and the angle $\alpha$.

10. The method according to claim 1, further comprising introducing a corrective steering moment into a steering system of the towing vehicle when the vehicle is about to move outside the traffic lane.

11. The method according to claim 1, further comprising activating the method by a trailer sensor.

12. A method for assisting a driver of a motor vehicle combination with a towing vehicle and a trailer comprising:
   determining, by a controller, a width of the motor vehicle combination;
   detecting, by a lane detector, a traffic lane;
   reading an ultrasonic sensor;
   calculating, by the controller using the reading from the ultrasonic sensor, a distance between the towing vehicle and the trailer;
   detecting, by a rear-facing camera an image of the trailer;
   calculating, by the controller using the image, an angle formed between a reference point and a front outside edge of the trailer;
   predicting, by the controller using the distance and the angle, a space required by the motor vehicle combination when travelling;
   calculating, by the controller, a nominal track for the towing vehicle such that the motor vehicle combination remains within the traffic lane, wherein the nominal track provides an anticipated path to maintain the motor vehicle combination in the traffic lane including in a curve, and when required by the space, defining the nominal path closer to the curve outside boundary of the traffic lane than the curve inside boundary, through the curve;

detecting, by a lane departure warning system, when the motor vehicle combination is about to move outside the traffic lane; and delivering, by the controller, a warning to the driver when the motor vehicle combination is about to move outside the traffic lane, as indicated by the motor vehicle combination moving off the nominal track.

13. A lane departure warning system of a towing vehicle comprising:
    a lane detector;
    a lane departure warning system;
    at least one rearward detecting sensor configured to capture a width of a trailer attached to the towing vehicle; and
    a controller in communication with the sensor and configured to:
    predict a space required by the motor vehicle combination when travelling;
    calculate a nominal track for the towing vehicle such that the motor vehicle combination remains within the traffic lane, wherein the nominal track provides an anticipated path to maintain the motor vehicle combination in the traffic lane including in a curve;
    allow departure of the towing vehicle from a center of the traffic lane through the curve;
    detect, by the lane departure warning system, when the motor vehicle combination is about to move outside the traffic lane; and
    deliver a warning when the motor vehicle combination is about to move outside the traffic lane, as indicated by the motor vehicle combination moving off the nominal track.

14. The lane departure warning system according to claim 13, further comprising:
    a first sensor configured to capture a distance of the towing vehicle from the trailer; and
    a second sensor configured to capture an angle formed by the trailer from a reference point;
    wherein the controller is further configured to:
    use a speed of the motor vehicle combination, a steering angle of the towing vehicle, the width of the trailer, the distance, and the angle to predict a space required for the motor vehicle combination when travelling through a curve; and
    deliver a steering correction to towing vehicle to keep motor vehicle combination on the nominal track.

15. The lane departure warning system according to claim 14, further comprising:
    an ultrasonic sensor for calculating the distance of the trailer; and
    a rear-facing camera for detecting the angle wherein the angle is formed between a reference point and a front outside edge of the trailer.

16. The lane departure warning system according to claim 14, wherein the controller is further configured to deliver the steering correction to move the motor vehicle trailer combination away from being centered in the traffic lane when travelling through the curve and when required due to the space that is calculated.

* * * * *